Dec. 14, 1965  J. TILTINS  3,223,866
ALTERNATOR
Filed Sept. 13, 1960  2 Sheets-Sheet 1
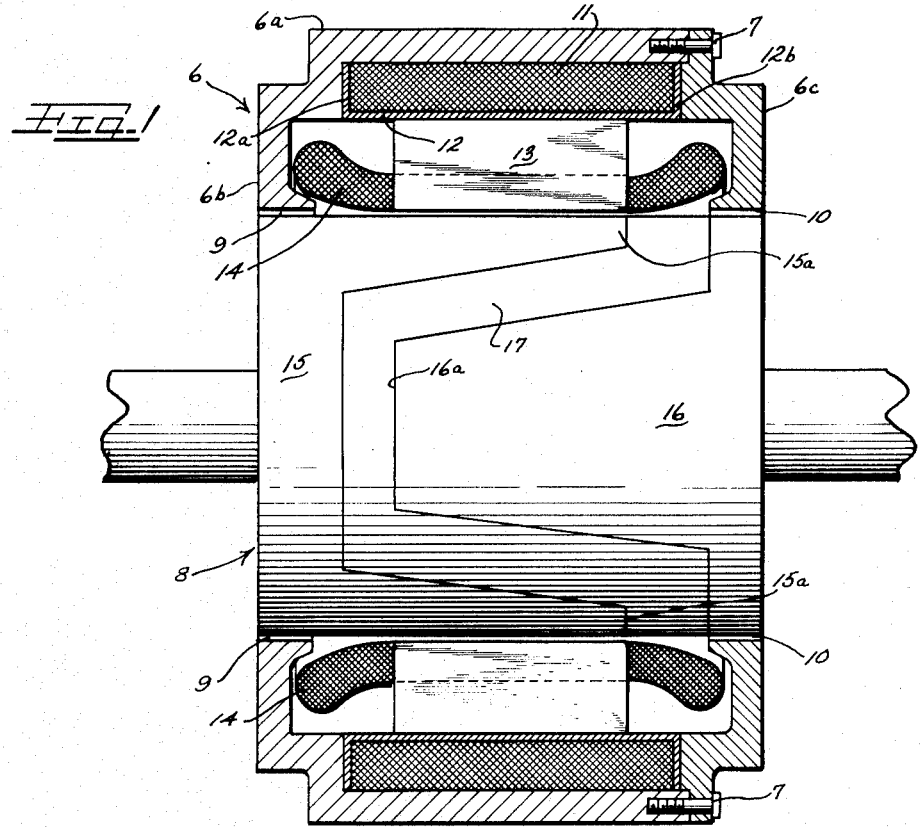
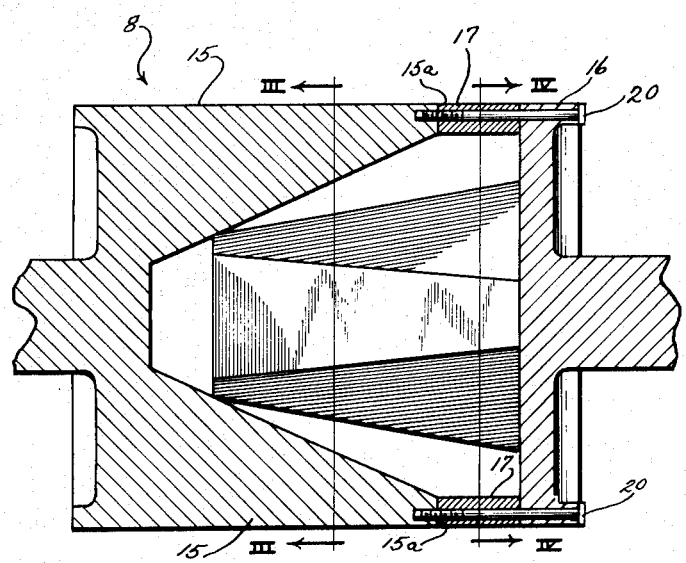
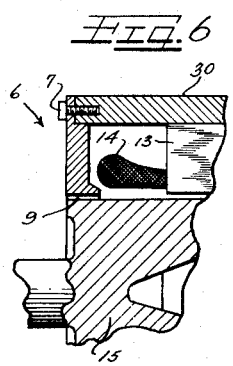
Inventor
JANIS TILTINS Inventor
JANIS TILTINS

United States Patent Office 3,223,866
Patented Dec. 14, 1965

3,223,866
ALTERNATOR
Janis Tiltins, East Cleveland, Ohio, assignor to TRW Inc., a corporation of Ohio
Filed Sept. 13, 1960, Ser. No. 55,791
2 Claims. (Cl. 310—155)

This invention relates to brushless alternators and is more particularly directed to improved brushless alternators for applications requiring maximum reliability at high operating temperatures and high rotor shaft speeds.

Heretofore, employment of the brush and wound rotor type alternators was unsatisfactory for applications such as nuclear power conversion systems, nuclear powered satellites, missiles, aircraft and the like, primarily because of the high shaft speed requirements and the high rotor temperatures produced at such speeds. The design of an alternator of this type satisfactorily meeting the power demands for such applications normally resulted in units of prohibitive weight.

By employment of the present invention, wherein the requirements for brushes and rotor windings are eliminated from the alternator configuration, I substantially eliminate the problems and difficulties of the prior art and provide alternator units satisfactorily meeting the requirements for nuclear power systems, satellite, missile and related applications.

It is therefore an object of the present invention to provide brushless alternators capable of producing high rotor speeds.

It is another object of the present invention to provide brushless alternators without rotor windings permitting employment of the alternator rotor at high speeds.

It is still another object of the present invention to provide brushless alternators operable at high rotor speeds and high operating temperatures.

It is a further object of the present invention to provide brushless alternators wherein the field coil or permanent magnet means are located in the alternator housing thereby facilitating the removal of heat and resulting in minimum operating temperature.

It is still a further object of the present invention to provide brushless alternators which are operable under space and other extraterrestrial conditions including the lack of atmospheric contaminants.

It is another object of the present invention to provide brushless alternators having windingless rotors permitting the employment of rotor shafts of variable diameter thereby substantially reducing the critical speed problems encountered in the design of high speed alternators.

Yet another object of the present invention is to provide a method of operating brushless alternators having high rotor speeds and low operating temperatures.

These and other objects, features, and advantages of the present invention will become more apparent from a careful consideration of the following detailed description, when considered in conjunction with the accompanying drawing, wherein like reference numerals and characters refer to like and corresponding parts throughout the several views.

On the drawing:

FIGURE 1 is a view in longitudinal section of a preferred embodiment of the present invention.

FIGURE 2 is a view in longitudinal section of the rotor of FIGURE 1.

FIGURE 6 is a fragmentary view in section which illustrates an alternate embodiment of the present invention wherein permanent magnet excitation is employed.

As shown on the drawing:

Figure 3:
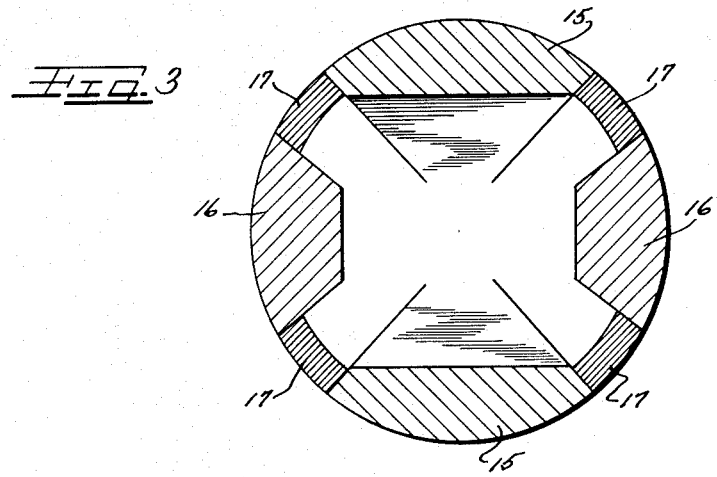
FIGURE 3 is a cross-sectional view taken along lines III—III of FIGURE 2, illustrating the north pole portion of the rotor.

As appears in FIGURE 1, a brushless alternator constructed in accordance with the present invention may comprise a housing, generally designated by reference numeral 6, which includes a cylindrical portion 6a having a radially inwardly extending wall 6b at one end thereof and an end cap 6c secured by screws 7 to the opposite end of the portion 6a to define a second radially inwardly extending wall. The housing 6 is constructed of magnetic material, preferably steel. A rotor 8 is journalled for rotation within the housing 6 and has a diameter slightly less than the internal diameter of the walls 6b and 6c, to define parasitic air gaps 9 and 10.

Magnetic flux is induced in the housing 6 by means of a field coil 11 disposed therewithin. Field coil 11 is wound on a cylindrical form 12 of non-magnetic material having end flanges 12a and 12b. A stator 13 is disposed within the form 12 and is preferably of conventional laminated construction on which windings 14 are disposed.

Figure 4:
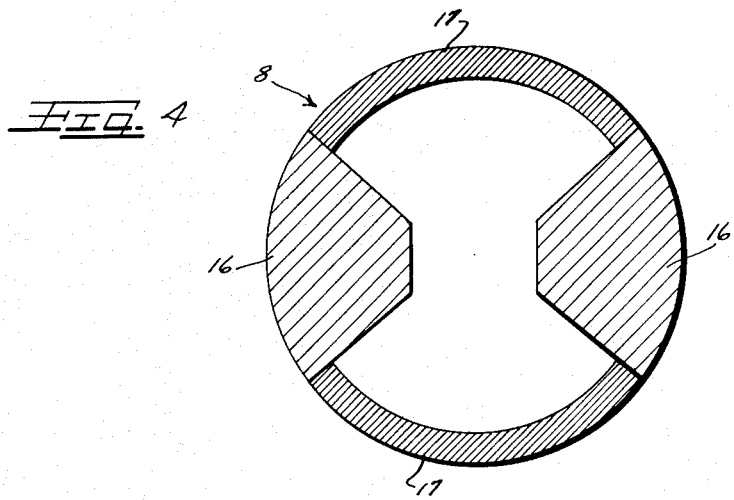
FIGURE 4 is a cross-sectional view taken along lines IV—IV of FIGURE 2 illustrating the south pole portion of the rotor.

The rotor 8 comprises a pair of sections 15 and 16 of magnetic material separated by a non-magnetic insert 17. (FIGURE 2.) The sections 15 and 16 and the insert or separator 17 may be secured together by welding or by means of a plurality of annularly spaced securing means, such as screws 20, of non-magnetic material passing through the insert 17 of non-magnetic material. (FIGURES 3 and 4.)

When a direct current is passed in one direction through the field coil 11, a north magnetic pole is induced at the end wall 6b of the housing 6 while a south magnetic pole is induced at the other end wall 6c. Through the parasitic air gaps 9 and 10, such magnetic poles are induced in the sections 15 and 16 of the rotor 8. It will be appreciated, of course, that the direction of the current flow through the coil 11 may be reversed, to reverse the poles.

Figure 5:
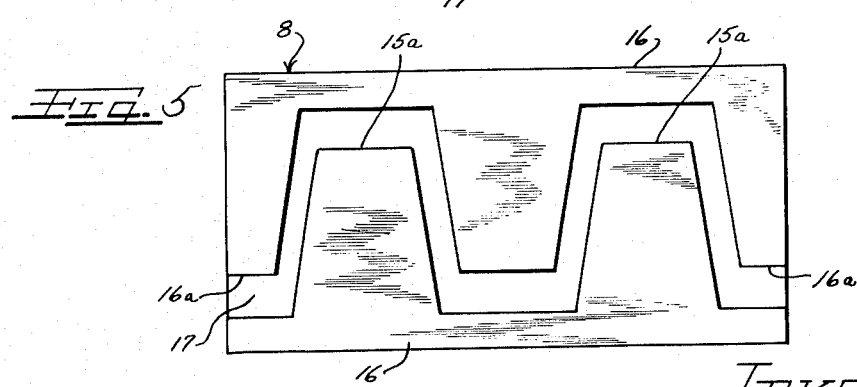
FIGURE 5 is a developed elevational view of the surface of the rotor of FIGURE 2.

To present poles for proper magnetic flux distribution, the rotor sections 15 and 16 are each formed with a pair of diametrically opposite axially extending finger-like portions 15a and 16a. (FIGURE 5.) Each finger-like portion of each section is disposed between the portions of the other section. The portions 15a and 16a are preferably tapered as illustrated and are separated by the non-magnetic separator 17.

It will be appreciated that a two pole alternator may be constructed, using only a single finger extension each section. Similarly, an alternator having more than four poles may be constructed, by adding additional finger extensions to each section.

In operation, the field coil 11 induces flux axially into magnetic housing 6 of the alternator which crosses the parasitic air gap 19 to the rotor magnetic section 15 of north polarity traveling out along the north pole fingers 15a. From thence the flux crosses the main air gap between the rotor and stator into the stator 13 and following the same path in the stator as normally found in conventional alternators, emerges from the stator, again crosses the main air gap between the stator and rotor into the south pole section 16 of the rotor. The flux then follows the path across the air gap 10 into the housing of the alternator. It will be appreciated that but one field coil 11 is employed which excites the entire flux path regardless of the number of poles employed. Thus the number of finger extensions 15a and 16a employed are limited only by the design requirements of the alternator. In addition, the non-magnetic insert 17 acts as a short circuited damper winding and assists in reducing transient flux effects. In addition, the embodiment shown in the drawing permits use of a rotor having a smooth and finished outer surface which assists in reducing windage losses and noise.

In the embodiment of the present invention appearing in FIGURE 6, a permanent magnet 30 or a plurality of magnetic bars of generally cylindrical configuration replaces the field coil of the embodiment of FIGURE 1. The permanent magnet 30 may comprise a cylindrical sleeve and cooperate with end walls 6b and 6c to define the housing 6.

North and south poles on the opposite ends of the magnetic housing are established by magnetizing axially the cylindrical portion of the magnetic housing. The operation of the permanent magnet apparatus of FIGURE 6 is similar to the operation of the apparatus of FIGURE 1.

Thus by employment of the present invention, there is provided an alternator having a rotor of increased mechanical strength when compared with the conventional type alternators which permits very high rotor speeds and allows higher alternator operating temperatures. Furthermore the alternator of the present invention may be employed advantageously in space and extraterrestrial applications requiring high rotor speeds.

Although minor modifications and variations might be suggested by those versed in the art, it is to be understood that I wish to encompass within the scope of the patent warranted hereon all such embodiments as reasonably and properly come within the scope of the patent warranted hereon.

I claim as my invention:

1. In an alternator, a stator of magnetic material, a housing of magnetic material having a cylindrical permanent magnet portion surrounding said stator and having a pair of walls spaced axially from the opposite ends of said stator, said permanent magnet being provided for inducing a north magnetic pole in one of said walls and a south magnetic pole in the other, a rotor of a diameter less than the inner diameter of the stator journaled for rotation within the stator, said rotor comprising a pair of opposed sections of magnetic material respectively coupled magnetically to said pair of walls, and at least one finger of magnetic material projecting axially from each of the rotor sections toward the other, said fingers being spaced angularly from one another to define poles for cooperation with said stator during operation of the alternator.

2. A rotory machine comprising
   (a) stator means of magnetic material,
   (b) rotor means journalled for rotation within said stator means and comprising a pair of sections of magnetic material having respective fingers projecting axially toward each other and spaced angularly from one another to define poles for cooperation with said stator means,
   (c) field producing means for inducing a magnetic field between the poles of said rotor means comprising an annular winding encircling said stator means, and
   (d) housing means having an axially extending cylindrical portion encircling said annular winding and disposed in direct heat exchange contact with said winding over substantially the entire axial extent thereof,
   (e) said housing having radially inwardly extending wall portions extending radially inwardly toward said rotor means on respective opposite axial sides of said stator means and terminating in closely spaced relation to said sections of said rotor means for applying the magnetomotive force of said winding directly to the respective sections of said rotor means.

References Cited by the Examiner
UNITED STATES PATENTS

| | | | |
|---|---|---|---|
| 588,602 | 8/1897 | Rice | 310—168 |
| 1,476,394 | 12/1923 | Dake | 310—155 |
| 1,853,220 | 4/1932 | Nowosielski | 310—155 |
| 2,307,604 | 1/1943 | Pollard | 310—168 |

ORIS L. RADER, *Primary Examiner.*

MILTON O. HIRSHFIELD, *Examiner.*